US012050726B2

(12) United States Patent
Lee et al.

(10) Patent No.: US 12,050,726 B2
(45) Date of Patent: Jul. 30, 2024

(54) AUGMENTED REALITY DEVICE FOR CHANGING INPUT MODE AND METHOD THEREOF

(71) Applicant: Samsung Electronics Co., Ltd., Suwon-si (KR)

(72) Inventors: Jinchoul Lee, Suwon-si (KR); Bokun Choi, Suwon-si (KR); Seungnyun Kim, Suwon-si (KR); Hyunsoo Kim, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/156,731

(22) Filed: Jan. 19, 2023

(65) Prior Publication Data

US 2023/0244301 A1     Aug. 3, 2023

Related U.S. Application Data

(63) Continuation of application No. PCT/KR2023/000124, filed on Jan. 4, 2023.

(30) Foreign Application Priority Data

Feb. 3, 2022   (KR) .................. 10-2022-0014417
Mar. 21, 2022  (KR) .................. 10-2022-0034739

(51) Int. Cl.
*G06F 3/01*        (2006.01)
*G02B 27/01*       (2006.01)
*G06V 40/20*       (2022.01)

(52) U.S. Cl.
CPC .......... *G06F 3/011* (2013.01); *G02B 27/0101* (2013.01); *G02B 27/017* (2013.01);
(Continued)

(58) Field of Classification Search
CPC ......... G06F 3/011; G06F 3/017; G06V 40/28; G02B 27/0101; G02B 27/017;
(Continued)

(56) References Cited

U.S. PATENT DOCUMENTS 10,902,250 B2   1/2021   Konin et al.
10,921,949 B2   2/2021   Holz et al.
(Continued)

FOREIGN PATENT DOCUMENTS

JP    2010-522380 A    7/2010
JP    2011-154524 A    8/2011
(Continued)

OTHER PUBLICATIONS

International Search Report dated Mar. 30, 2023, issued in International Application No. PCT/KR2023/000124.

*Primary Examiner* — Stacy Khoo
(74) *Attorney, Agent, or Firm* — Jefferson IP Law, LLP

(57) ABSTRACT

An electronic device is provided. The electronic device includes at least one processor, at least one camera, and at least one display, wherein the processor may be configured to identify whether or not a situation requires entering a finger mode for an image including at least one or more objects received through the at least one camera, based on whether or not specified conditions are satisfied for the at least one or more objects, if the situation is identified to require entering the finger mode, execute a finger mode providing a user interface corresponding to the finger mode, and, if there are virtual objects provided before entering the finger mode, modify the properties of at least some of the virtual objects provided before entering the finger mode and display same in a specified area within a display area of the user interface corresponding to the finger mode.

20 Claims, 14 Drawing Sheets

(52) U.S. Cl.
CPC ......... *G02B 27/0179* (2013.01); *G06F 3/017* (2013.01); *G06V 40/28* (2022.01); *G02B 2027/0138* (2013.01); *G02B 2027/014* (2013.01); *G02B 2027/0178* (2013.01); *G02B 2027/0185* (2013.01)

(58) Field of Classification Search
CPC ........ G02B 27/0179; G02B 2027/0138; G02B 2027/014; G02B 2027/0178; G02B 2027/0185
See application file for complete search history.

(56) References Cited

U.S. PATENT DOCUMENTS

| | | |
|---|---|---|
| 2008/0231926 A1 | 9/2008 | Klug et al. |
| 2014/0298261 A1 | 10/2014 | Imoto et al. |
| 2021/0097776 A1 | 4/2021 | Faulkner et al. |
| 2021/0232212 A1 | 7/2021 | Stolzenberg et al. |
| 2022/0050582 A1* | 2/2022 | Zhou ................... G06F 3/0482 |
| 2022/0206298 A1* | 6/2022 | Goodman ............. G06F 3/0481 |

FOREIGN PATENT DOCUMENTS

| | | |
|---|---|---|
| KR | 10-2016-0103897 A | 9/2016 |
| KR | 10-1962872 B1 | 3/2019 |
| KR | 10-2019-0059726 A | 5/2019 |
| KR | 10-2020-0063495 A | 6/2020 |

* cited by examiner

[a]

[b]

AUGMENTED REALITY DEVICE FOR CHANGING INPUT MODE AND METHOD THEREOF

CROSS-REFERENCE TO RELATED APPLICATION(S)

This application is a continuation application, claiming priority under § 365(c), of an International application No. PCT/KR2023/000124, filed on Jan. 4, 2023, which is based on and claims the benefit of a Korean patent application number 10-2022-0014417, filed on Feb. 3, 2022, in the Korean Intellectual Property Office, and of a Korean patent application number 10-2022-0034739, filed on Mar. 21, 2022, in the Korean Intellectual Property Office, the disclosure of each of which is incorporated by reference herein in its entirety.

TECHNICAL FIELD

The disclosure relates to an electronic device. More particularly, the disclosure relates to a method of switching an input mode in an electronic device that provides an augmented reality service.

BACKGROUND ART

Augmented reality (AR) is a technology that combines a real space and a virtual space such that a virtual object appears to exist in the real space, and augmented reality may be derived from virtual reality that produces a virtual space similar to reality using computer graphics.

As electronic devices for providing an AR service (hereinafter referred to as AR devices), wearable electronic devices capable of being directly worn on the body are being developed. For example, wearable electronic devices providing augmented reality may include a head-mounted device or head-mounted display (HMD), or AR glasses.

The AR devices described above may receive an input through a gesture using a controller or both hands of a user and operate according to the received input.

AR devices may recognize 6 degrees of freedom (Dof), detect motions of the user wearing the same through a sensor or camera, and, based on this, may display a screen in the direction of a front field of view among the 360-degree screen through a display.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

In a situation where the motion of the user wearing the AR device is restricted, execution of an operation of switching the screen according to a gesture input using both hands to the AR device or a change in the direction of the user's field of view may be limited.

Aspects of the disclosure are to address at least the above-mentioned problems and/or disadvantages and to provide at least the advantages described below. Accordingly, an aspect of the disclosure is to provide an input mode capable of being used in a situation in which input to the AR device is limited and a method of switching the input mode.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes at least one processor, at least one camera, and at least one display, wherein the processor may be configured to identify whether or not a situation requires entering a finger mode for an image including at least one or more objects received through the at least one camera, based on whether or not specified conditions are satisfied for the at least one or more objects, in case that the situation is identified to require entering the finger mode, execute a finger mode providing a user interface corresponding to the finger mode, and, in case that there are virtual objects provided before entering the finger mode, modify the properties of at least some of the virtual objects provided before entering the finger mode and display same in a specified area within a display area of the user interface corresponding to the finger mode.

In accordance with another aspect of the disclosure, a method of an electronic device is provided. The method includes identifying whether or not a situation requires entering a finger mode for an image including at least one or more objects received through at least one camera, based on whether or not specified conditions are satisfied for the at least one or more objects, in case that the situation is identified to require entering the finger mode, executing a finger mode providing a user interface corresponding to the finger mode, and according to the execution of the finger mode, in case that there are virtual objects provided before entering the finger mode, modifying the properties of at least some of the virtual objects provided before entering the finger mode and displaying the same in a specified area within a display area of the user interface corresponding to the finger mode.

Advantageous Effects of Invention

According to various embodiments, it is possible to provide an augmented reality (AR) device capable of switching to an input mode that allows effective input even in a situation in which input to the AR device is restricted, and a method therefor.

According to the disclosure, it is possible to provide an AR device capable of switching a screen according to a user's intention even in a situation in which the motion of a user of the AR device is restricted, and a method therefor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces FIG. 1 is a block diagram illustrating an electronic device in a network environment according to an embodiment of the disclosure.

Figure 1:
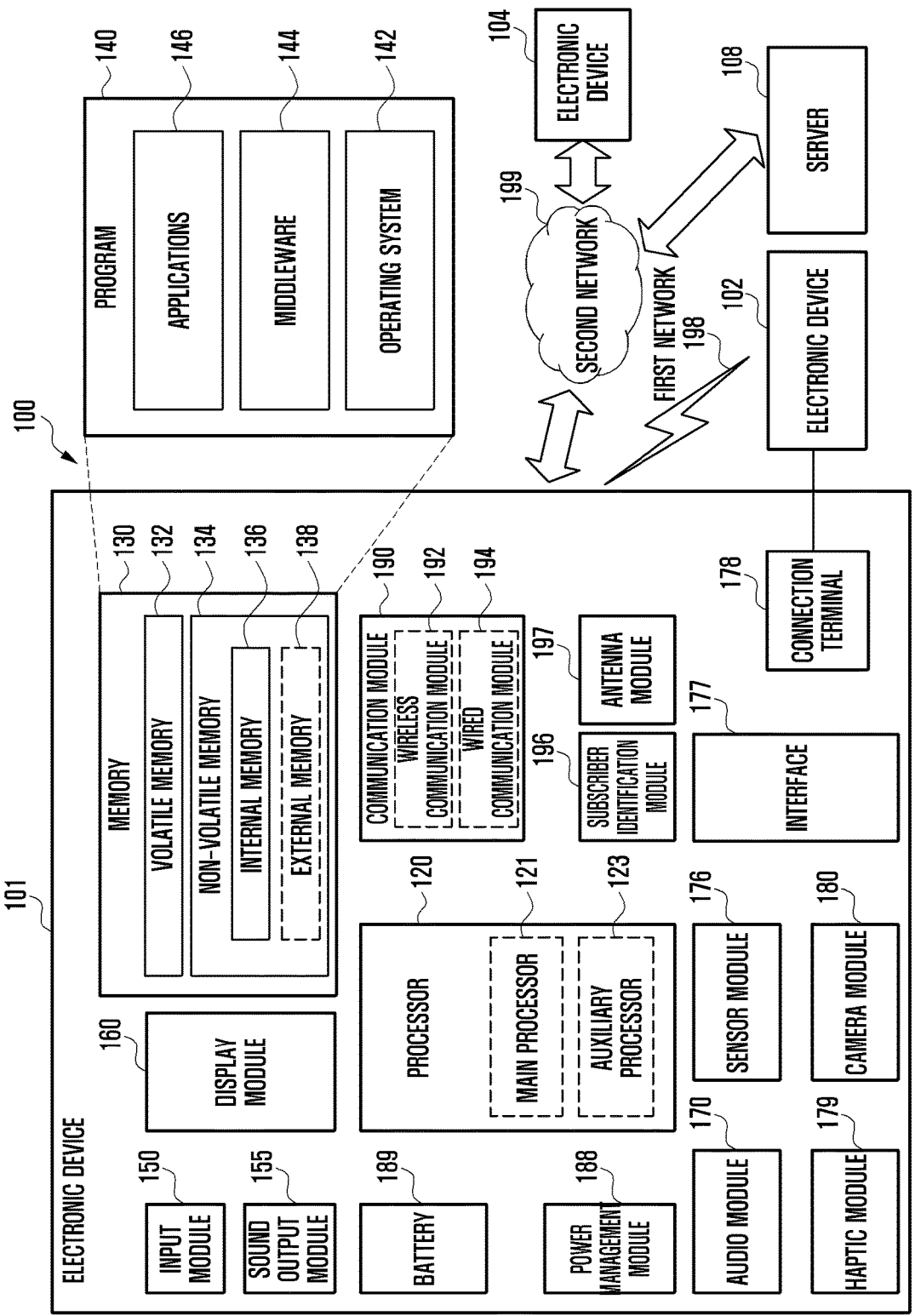
FIG. 1 is a block diagram of a terminal device according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," coupled "to, connected with" "," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
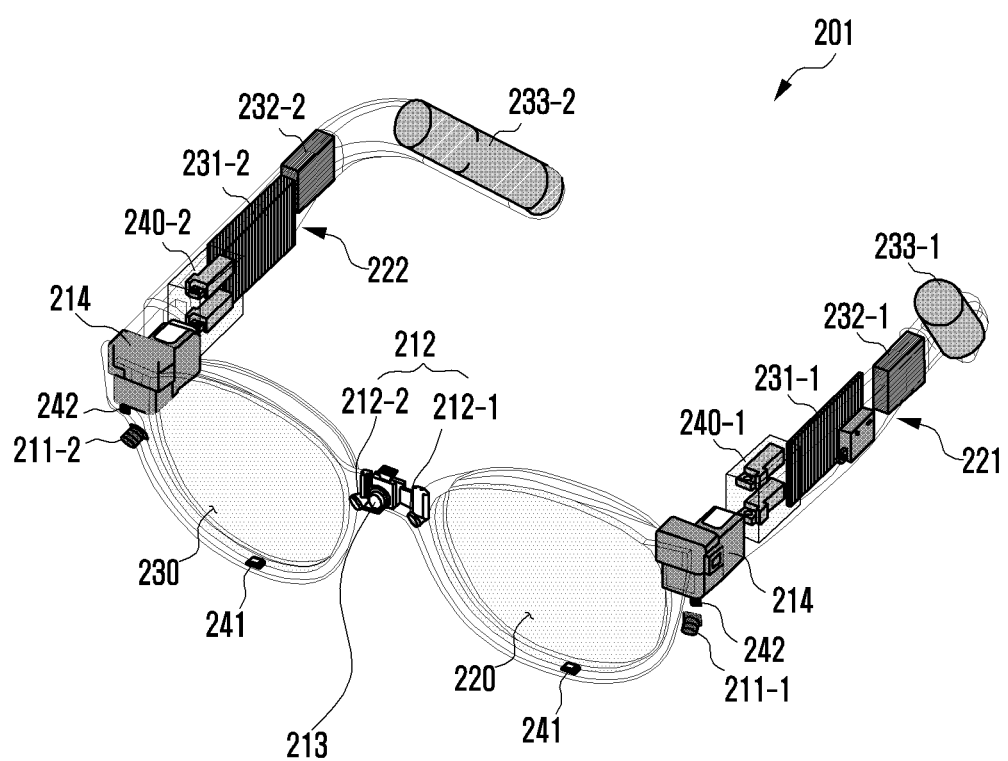
FIG. 2A is a diagram illustrating the overall configuration of an augmented reality (AR) device according to an embodiment of the disclosure.

FIG. 2A is a diagram illustrating the overall configuration of an augmented reality (AR) device according to an embodiment of the disclosure.

Figure 2B:
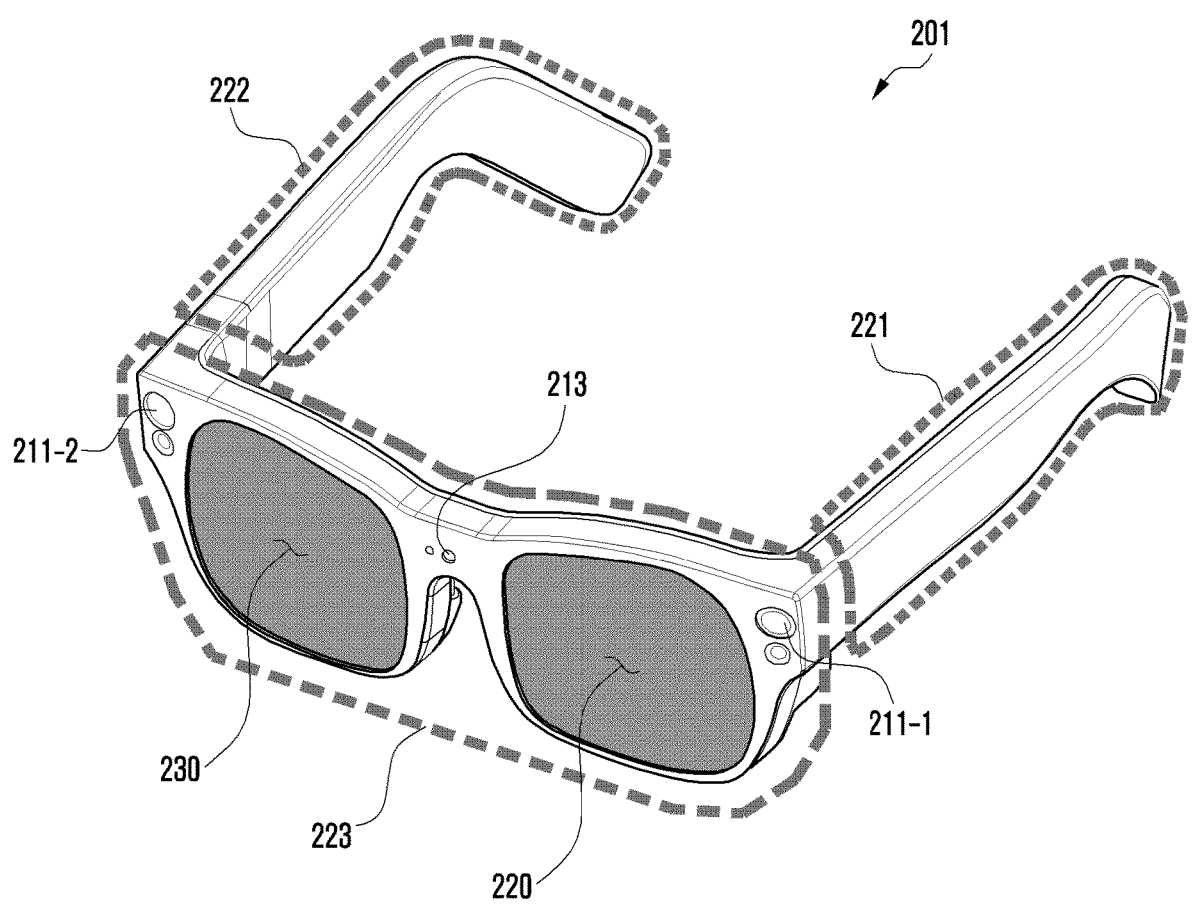
FIG. 2B is a diagram illustrating the front side of an AR device according to an embodiment of the disclosure.

FIG. 2B is a diagram illustrating the front side of an AR device according to an embodiment of the disclosure.

Figure 2C:
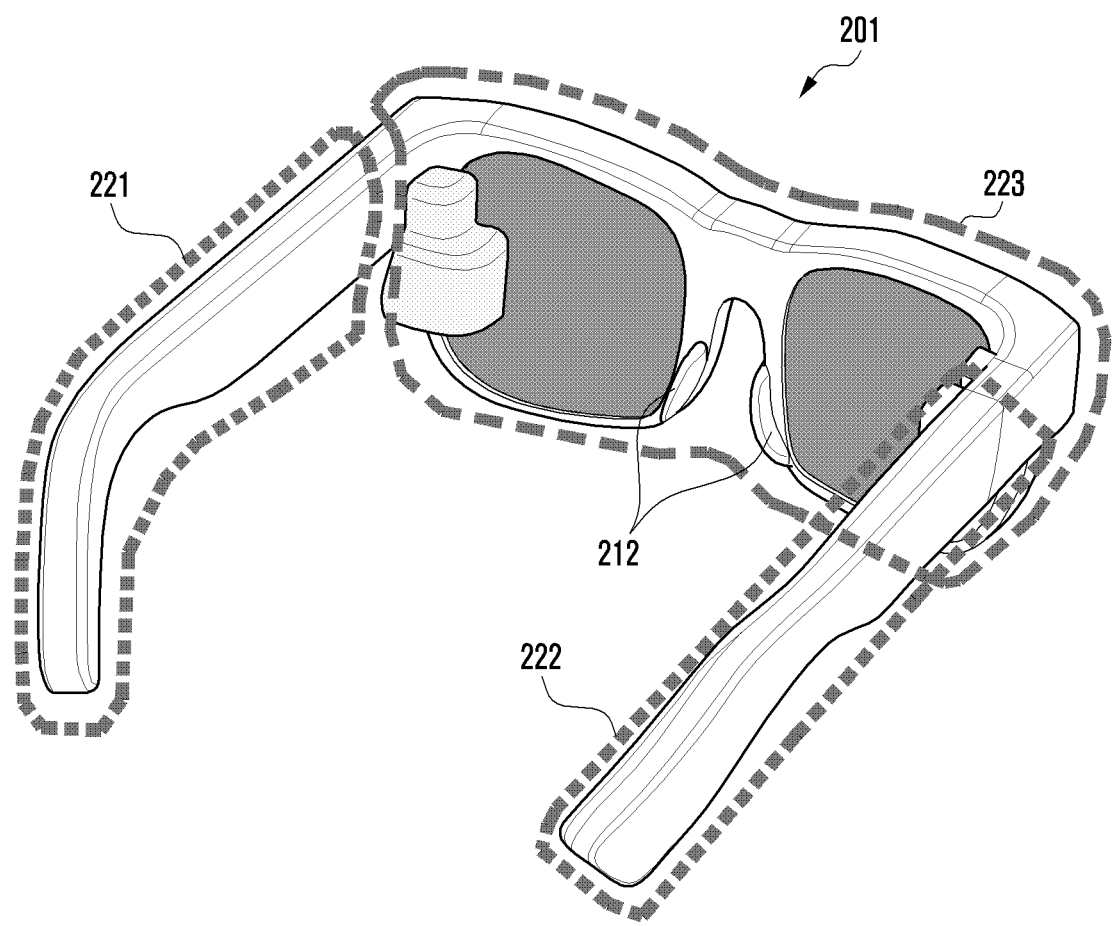
FIG. 2C is a diagram illustrating the rear side of an AR device according to an embodiment of the disclosure.

FIG. 2C is a diagram illustrating the rear side of an AR device according to an embodiment of the disclosure.

FIG. 2B is a first view illustrating the front side of an AR device 201, FIG. 2C is a second view illustrating the rear side of the AR device 201, and the internal configuration thereof may be the same as that shown in FIG. 2A.

In various embodiments, the AR device 201 may be worn on the user's head to provide the user with an image related to an augmented reality service. According to an embodiment, the AR device 201 may provide an augmented reality service of outputting at least one virtual object in an area, which is determined as a field of view (FoV) of the user, so as to be superimposed thereon. For example, the area determined as the user's field of view is an area determined to be recognizable by the user wearing the AR device 201 through the AR device 201, may be an area including all or at least a part of the display module (e.g., the display module 350 in FIG. 3) of the AR device 201. According to an embodiment, the AR device 201 may include a plurality of glass members (e.g., a first glass member 220 and/or a second glass member 230) corresponding to both eyes (e.g., the left and/or right eye) of the user, respectively. The plurality of glass members may include at least a part of the display module (e.g., the first display module 351 and/or the second display module 352 in FIG. 3). For example, a first display module 351 may be included in the first glass member 220 corresponding to the user's left eye, and a second display module 352 may be included in the second glass member 230 corresponding to the user's right eye. For example, the AR device 201 may be configured in the form of at least one of glasses, goggles, a helmet, or a hat, but is not limited thereto.

Referring to FIG. 2A, the AR device 201 according to an embodiment may include a display module 214, a camera module, an audio module, a first support 221, and/or a second support 222. According to an embodiment, the display module may include a first display (e.g., the first glass member 220) (e.g., the first display module 351 in FIG. 3) and/or a second display (e.g., the second glass member 230) (e.g., the second display module 352 in FIG. 3). According to an embodiment, at least one camera may include a photographing camera 213 for photographing an image corresponding to the user's field of view (FoV) and/or measuring a distance to an object, an eye tracking camera 212 for identifying the direction of a user's gaze, and/or gesture cameras 211-1 and 211-2 for recognizing a specific space. For example, the photographing camera 213 may photograph objects in the front direction of the AR device 201, and the eye tracking camera 212 may photograph objects in a direction opposite the photographing direction of the photographing camera 213. For example, the eye tracking camera 212 may at least partially photograph both eyes of the user. According to an embodiment, the first support 221 and/or the second support 222 may include a printed circuit boards (PCBs) 231-1 and 231-2, speakers 232-1 and 232-2, and/or batteries 233-1 and 233-2.

According to an embodiment, the display module (e.g., the display module 214 in FIG. 2A) may be disposed in the body part (e.g., the body part 223 in FIG. 2B) of the AR device 201, and may include condensing lens (not shown) and/or transparent waveguides (not shown) included in the glass members (e.g., the first glass member 220 and the second glass member 230). For example, the transparent waveguide may be at least partially positioned in a portion of the glass members. According to an embodiment, the light emitted from the display module may be incident to one end of the glass member through the first glass member 220 and the second glass member 230, and the incident light may be transmitted to the user through a waveguide formed in the glass member. The waveguide may be made of glass, plastic, or polymer, and may include a nano-pattern, for example, a polygonal or curved grating structure, formed on an inner or outer surface. According to an embodiment, the incident light may be propagated or reflected by the nanopattern inside the waveguide and provided to the user. According to an embodiment, the waveguide may include at least one of at least one diffractive element (e.g., a diffractive optical element (DOE) or a holographic optical element (HOE)) or a reflective element (e.g., a reflective mirror). According to an embodiment, the waveguide may guide display light emitted from a light source to the user's eyes using at least one diffractive element or reflective element.

Referring to FIG. 2A, the first support 221 and/or the second support 222 may include printed circuit boards 231-1 and 231-2 for transmitting electrical signals to respective elements of the AR device 201, speakers 232-1 and 232-2 for outputting audio signals, batteries 233-1 and 233-2, and/or hinge parts 240-1 and 240-2 for at least partial coupling to the body part 223 of the AR device 201. According to an embodiment, the speakers 232-1 and 232-2 may include a first speaker 232-1 for transmitting an audio signal to the user's left ear and a second speaker 232-2 for transmitting an audio signal to the user's right ear. According to an embodiment, the AR device 201 may have a plurality of batteries 233-1 and 233-2 provided therein and provide power to the printed circuit boards 231-1 and 231-2 through a power management module.

Referring to FIG. 2A, the AR device 201 may include a microphone 241 for receiving a user's voice and ambient sounds. The AR device 201 may include at least one light-emitting device (illumination LED) 242 for increasing the accuracy of at least one camera (e.g., the photographing camera 213, the eye tracking camera 212, and/or the gesture cameras 211-1 and 211-2). For example, the light-emitting device 242 may be used as an auxiliary means for increasing accuracy when photographing user's pupils with the eye tracking camera 212, and the light-emitting device 242 may use an IR LED of an infrared wavelength other than a visible light wavelength. As another example, if it is not easy to detect a subject to be photographed in a dark environment or due to mixing and reflected light of various light sources when photographing a user's gesture using the gesture cameras 211-1 and 211-2, the light-emitting device 242 may be used as an auxiliary means.

Referring to FIGS. 2B and 2C, the AR device 201 according to an embodiment may include a body part 223 and supports (e.g., a first support 221 and/or a second support 222), and the body part 223 and the supports 221 and 222 may be in an operatively connected state. For example, the body part 223 and the supports 221 and 222 may be operatively connected through the hinge parts 240-1 and 240-2. The body part 223 may be at least partially mounted on the user's nose and may include a display module and a camera module. The supports 221 and 222 may include a support member mounted on the user's ear and include a first support 221 mounted on the left ear and/or a second support 222 mounted on the right ear. According to an embodiment, the first support 221 or the second support 222 may at least partially include printed circuit boards 231-1 and 231-2, speakers 232-1 and 232-2, and/or batteries 233-1 and 233-2. The battery may be electrically connected to a power management module.

According to an embodiment, the display module may include a first glass member 220 and/or a second glass member 230, and provide visual information to the user through the first glass member 220 and the second glass member 230. The AR device 201 may include the first glass member 220 corresponding to the left eye and/or the second glass member 230 corresponding to the right eye. According to an embodiment, the display module may include a display panel and/or lenses (e.g., glass members). For example, the display panel may include a transparent material such as glass or plastic.

According to an embodiment, the display module may be formed of a transparent element, and the user may recognize the real space behind the display module through the display module. The display module may display a virtual object in at least a portion of the transparent element such that the user views the virtual object as being added to at least a portion of the real space. The first glass member 220 and/or the second glass member 230 included in the display module may include a plurality of display panels corresponding to both eyes (e.g., the left eye and/or the right eye) of the user, respectively.

According to an embodiment, the AR device 201 may include a virtual reality (VR) device.

According to an embodiment, a virtual object output through the display module may include information related to an application program executed in the AR device 201 and/or information related to an external object positioned in the real space, which corresponds to the area determined as the user's field of view (FoV). For example, the AR device 201 may identify an external object included in at least a portion corresponding to the area determined as the user's field of view (FoV) from image information related to the real space obtained through the camera (e.g., the gesture cameras 211-1 and 211-2 in FIGS. 2A and 2B) of the AR device 201. The AR device 201 may output (or display) a virtual object related to the external object identified in at least the portion to the area determined as the user's field of view in the display area of the AR device 201. The external object may include an object existing in the real space. According to various embodiments, the display area in which the AR device 201 displays the virtual object may include a portion of the display (e.g., at least a portion of the display panel). According to an embodiment, the display area may be an area corresponding to at least a portion of the first glass member 220 and/or the second glass member 230.

According to an embodiment, the AR device 201 may include a photographing camera 213 (e.g., an RGB camera) for photographing an image corresponding to the user's field of view (FoV) and/or measuring a distance to an object, an eye tracking camera 212 for identifying the direction of a user's gaze, and/or gesture cameras 211-1 and 211-2 for recognizing a specific space. According to an embodiment, the AR device 201 may measure a distance to an object located in the front direction of the AR device 201 using the photographing camera 213. According to an embodiment, the AR device 201 may have a plurality of eye tracking cameras 212 disposed to correspond to both eyes of the user. For example, the eye tracking camera 212 may photograph an object in a direction opposite the photographing direction of the photographing camera 213. The eye tracking camera 212 may detect the user's gaze direction (e.g., eye movement). For example, the eye tracking camera 212 may include a first eye tracking camera 212-1 for tracking the gaze direction of a user's left eye, and a second eye tracking camera 212-2 for tracking the gaze direction of a user's right eye. According to an embodiment, the AR device 201 may detect a user gesture within a predetermined distance (e.g., a predetermined space) using the gesture cameras 211-1 and 211-2. For example, a plurality of gesture cameras 211-1 and 211-2 may be configured and may be disposed on both sides of the AR device 201. The AR device 201 may detect an eye corresponding to a primary eye and/or an auxiliary eye from among the left eye and/or the right eye using at least one camera. For example, the AR device 201 may detect an eye corresponding to a primary eye and/or an auxiliary eye, based on a user's gaze direction with respect to an external object or a virtual object.

According to an embodiment, the photographing camera 213 may include a high-resolution (HR) camera such as a photo video (PV) camera. According to an embodiment, the eye tracking camera 212 may detect user's pupils to track the gaze direction, and may be utilized to move the center of a virtual image to correspond to the gaze direction. For example, the eye tracking camera 212 may be divided into a first eye tracking camera 212-1 corresponding to the left eye and a second eye tracking camera 212-2 corresponding to the right eye, which may have substantially the same performance and/or specification. According to an embodiment, the gesture cameras 211-1 and 211-2 may be used for detecting a user's hand (gesture) and/or spatial recognition, and may include a global shutter (GS) camera. For example, gesture cameras 211-1 and 211-2 may include GS cameras with low screen drag, such as rolling shutter (RS) cameras, in order to detect and track quick hand motions and/or minute motions such as fingers.

According to an embodiment, the AR device 201 may display a virtual object related to an augmented reality service, based on image information related to a real space obtained through the camera (e.g., the camera 320 in FIG. 3) of the AR device 201. According to an embodiment, the AR device 201 may display the virtual object, based on the display module (e.g., the first display module 351 corresponding to the left eye and/or the second display module 352 corresponding to the right eye) disposed to correspond to both eyes of the user. According to an embodiment, the AR device 201 may display the virtual object, based on preconfigured configuration information (e.g., resolution, a frame rate, brightness, and/or display area).

According to an embodiment, the AR device 201 may operate the first display panel included in the first glass member 220 and the second display panel included in the second glass member 230 as independent elements. For example, the AR device 201 may determine display performance of the first display panel, based on first configuration information, and determine display performance of the second display panel, based on second configuration information.

The number and positions of one or more cameras (e.g., the photographing camera 213, the eye tracking camera 212, and/or the gesture cameras 211-1 and 211-2) included in the AR device 201 shown in FIGS. 2A, 2B, and/or 2C are not limited. For example, the number and positions of one or more cameras (e.g., the photographing camera 213, the eye tracking camera 212, and/or the gesture cameras 211-1 and 211-2) may vary depending on the form (e.g., shape or size) of the AR device 201.

Figure 3:
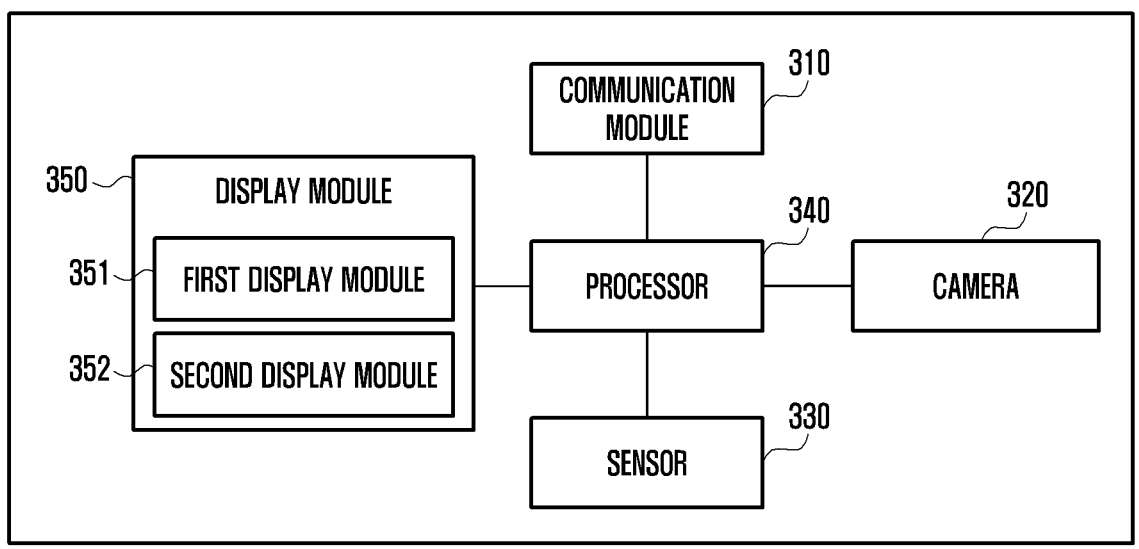
FIG. 3 is a block diagram of an AR device according to an embodiment of the disclosure.

FIG. 3 is a block diagram of an AR device (e.g., an AR device in FIGS. 2A to 2C) according to an embodiment of the disclosure.

Referring to FIG. 3, an AR device 201 may be in the form of glasses capable of being worn on a user as shown in FIGS. 2A to 2C.

Referring to FIG. 3, the AR device 201 may include a communication module 310 (e.g., the communication module 190 in FIG. 1), a camera 320 (e.g., the camera module 180 in FIG. 1), a sensor 330 (e.g., the sensor module 176 in FIG. 1), a display module 350 (e.g., the display module 160 in FIG. 1), and a processor 340 (e.g., the processor 120 in FIG. 1).

According to an embodiment, in order to provide an augmented reality service, the AR device 201 may obtain information about a real surrounding environment including location information, size information, distance information, sensor information, and image information of various real objects using a sensor or a camera. The AR device 201 may produce a virtual object, based on the information about the surrounding environment, and output the same through the display.

The AR device 201 may be in the form of glasses capable of being worn on a user as shown in FIGS. 2A to 2C.

The communication module 310 may include a software and/or hardware module (e.g., a communication processor (CP)) for wireless communication with a network or a server (e.g., the server 108 in FIG. 1).

The camera 320 may take a still image and a moving image. According to an embodiment, the camera may include one or more lenses and image sensors. According to various embodiments, the camera 320 may include at least some of the functions and/or configurations of the camera module in FIGS. 2A to 2C. The camera 320 may be implemented to perform a simultaneous localization-and-mapping (SLAM) function for estimating a position by including a plurality of cameras and/or a 6-degrees-of-freedom (6DoF) function by obtaining images of various aspects.

According to an embodiment, the camera 320 may include a photographing camera (e.g., the photographing camera 213 in FIGS. 2A and 2B) for photographing an image corresponding to the user's field of view (FoV) and/or measuring a distance to an object, an eye tracking camera (e.g., the eye tracking camera 212 in FIGS. 2A to 2C) for identifying the direction of a user's gaze, and/or a gesture camera (e.g., the gesture cameras 211-1 and 211-2 in FIGS. 2A and 2B) for recognizing a specific space. For example, the photographing camera 213 may photograph objects in the front direction of the AR device 201, and the eye tracking camera 212 may photograph objects in a direction opposite the photographing direction of the photographing camera 213. For example, the eye tracking camera 212 may at least partially photograph both eyes of the user.

The sensor 330 may detect movement of the AR device. According to various embodiments, the sensor may detect a physical quantity related to the movement of the AR device, for example, the velocity, acceleration, angular velocity, angular acceleration, and a geographic position of the AR device. The sensor 330 may include various sensors and detect the movement of the AR device including the position, speed, and/or posture of the AR device by including a gyro sensor and a gravity sensor.

The display module 350 may visually output information processed by the processor 340 of the AR device. For example, the display module 350 may display various virtual objects, based on virtual information received from a memory (not shown) of the AR device or a server, or based on virtual information produced by the processor 340.

According to various embodiments, the display module 350 may include the glass members (e.g., the first glass member 220 and the second glass member 230) in FIG. 2A, emit light to a transparent waveguide included in at least a portion of the glass members, and guide the emitted light to the user's eyes, thereby outputting virtual information. The display module 350 may include a first display module 351 (e.g., the first glass member 220 in FIG. 2A) corresponding to the user's left eye and a second display module 352 (e.g., the second glass member 230 in FIG. 2A) corresponding to the user's right eye. According to an embodiment, the display module 350 may include a glass member configured as a transparent (or translucent) element, and the user may recognize the real space behind the display module 350 through the display module 350. The display module 350 may display a virtual object in at least a portion of the transparent element such that the user views the virtual object as being added to at least a portion of the real space.

The processor 340 may control at least one other element related to the function of the AR device and perform data processing and calculation necessary to perform the function. The processor 340 may be electrically and/or functionally connected to elements of the AR device such as the communication module 310, the camera, the sensor, and the display module 350.

According to various embodiments, the processor 340 may measure a physical quantity (e.g., geographic location, velocity, acceleration, angular velocity, and angular acceleration of the AR device) related to the movement of the AR device through a sensor and obtain movement information of the AR device using the measured physical quantity or a combination thereof.

According to various embodiments, the processor 340 may obtain image information from an image photographed by the camera 320. For example, the processor 340 may obtain image information including size information, distance information, and depth information of external real objects from an image photographed by the camera.

According to various embodiments, the processor 340 may obtain virtual information, based on the movement information of the AR device and/or the image information, and produce a virtual object, based thereon.

According to various embodiments, the processor 340 may analyze an actual image corresponding to the field of view of the AR device, based on the movement information of the AR device and/or the image information obtained from the camera, thereby determining the surrounding situation of the AR device. For example, the processor 340 may analyze information such as the number of real objects, such as objects or people in front of the AR device, and the sizes or distances of the objects, based on the image information, and determine whether or not an input mode of the AR device is required to be changed.

According to various embodiments, the input mode of the AR device may be usually a both-handed mode in which a both-handed gesture is used and in which an input is received by recognizing a gesture through the camera.

According to various embodiments, the processor 340 may switch the input mode of the AR device to a finger mode in a high congestion situation. The finger mode may include, for example, an input mode in which an input is performed through a gesture by fingers of one hand.

According to various embodiments, a congested situation may be specified in advance and may include, for example, the case of entering a specified place (e.g., a public place or a place using a public access point (AP)), the case where there is a real object detected within a specified distance (e.g., 1.5 meters) in the field of view, based on the angle of view of the camera, and the case where there is a real object within a specified distance (e.g., 1.5 meters and/or 0.8 meters) in the display field of view (FoV).

According to various embodiments, if it is determined that the situation is congested, the processor 340 may ask the user whether or not to switch the input mode of the AR device to the finger mode. For example, the processor 340 may preconfigure a congestion level for a congested situation and, if the congestion level is greater than or equal to a specified level, determine whether or not to enter the finger mode. For example, if the congestion level is greater than or equal to a specified level, the user may be asked whether or not to switch to the finger mode. The processor 340 may further monitor the congestion level even when the congestion level is less than or equal to a specified level.

According to various embodiments, the congestion level may be configured to increase as the inconvenience of performing a gesture increases in an actual use environment. According to an embodiment, the congestion level may be configured depending on the distances of detected objects. For example, the congestion level may be configured to be lower in the case where a real object is detected within 1.5 meters than in the case where the real object is detected within 0.8 meters. For example, even if a real object is detected within the same 1.5 meters, the congestion level may be configured to be lower in the case of detection by a head tracking (HeT) camera having a large angle of view (e.g., the photographing camera 213 in FIG. 2A or 2B) than in the case of detection in a small angle of view of a display.

According to an embodiment, the congestion level may be configured depending on the number of objects detected within a specified distance. For example, if only one real object is detected within 1.5 meters, it may not inquire whether or not to enter the finger mode. On the other hand, for example, if a large number of real objects are detected within 1.5 meters, it is possible to inquire whether or not to enter the finger mode.

Figure 4:
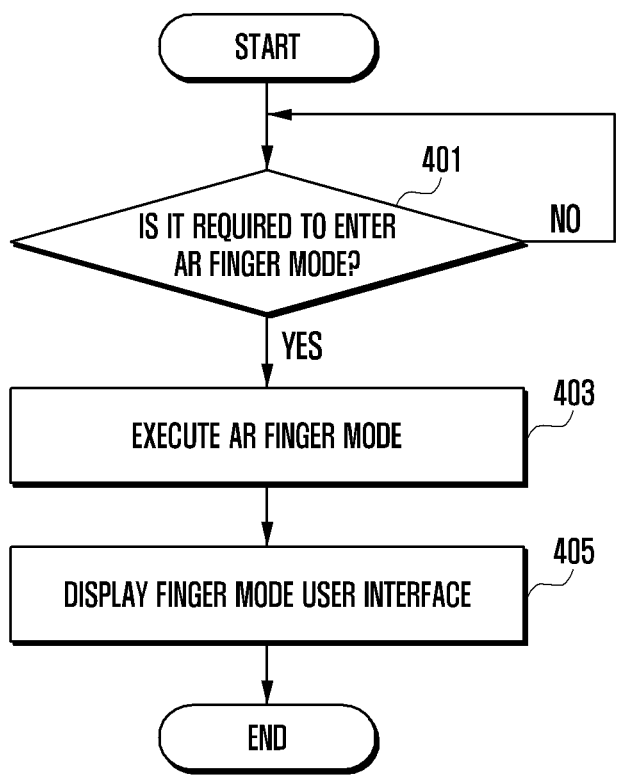
FIG. 4 is flowchart illustrating an operation of an AR device according to an embodiment of the disclosure.

FIG. 4 is flowchart illustrating an operation of an AR device (e.g., an AR device in FIG. 3) according to an embodiment of the disclosure. Hereinafter, operations performed by the AR device 201 may be performed by a processor (e.g., the processor 340 in FIG. 3).

Referring to FIG. 4, after an AR device 201 is worn on and turned on by the user, the AR device may identify whether or not to enter the finger mode in operation 401. The AR device 201 may identify whether or not the situation requires entering the finger mode, based on an image received through a camera (e.g., the camera 320 in FIG. 3).

The AR device 201 may identify at least one object in the received image, based on information of an image photographed by the camera (e.g., the camera 320 in FIG. 3) and determine whether or not the situation requires entering the finger mode depending on whether or not specified conditions are satisfied for the at least one object.

According to an embodiment, the specified conditions for the at least one object may include one or more of conditions for the position and time at which the at least one object is identified, and the number and shapes of the objects. For example, if the at least one object has a finger shape, it is possible to identify whether or not the situation requires entering the finger mode depending on whether or not the shape is a specified shape or depending on whether or not the shape is identified for a specified time or longer. For example, it is possible to determine whether or not the situation is congested based on the number and positions of the one or more objects, and if the situation is congested, it is possible to identify whether or not to enter the finger mode.

According to an embodiment, if specified conditions are satisfied, the AR device 201 may further cause the user to select whether or not to enter the finger mode. For example, the AR device 201 may inquire whether or not to enter the finger mode using text and/or sound, and identify entry to the finger mode according to a specified input (e.g., a combination of specific keys or a touch pattern) or gesture (e.g., maintaining the palm or back of the hand for a specified time or longer, or drawing FM, which is the abbreviation for finger mode, in the air) of the user.

If the situation is identified to require entering the finger mode, the AR device 201 may proceed to the finger mode in operation 403. The finger mode may provide a display area according to, for example, a user interface capable of operating according to a finger input, based on a user's finger motion.

According to an embodiment, the AR device 201 may provide a user interface according to the finger mode in operation 405. The user interface according to the finger mode, if there are virtual objects provided before entering the finger mode, may modify the properties of at least some of the at least one or more virtual objects and display same in a specified area within the display area of the user interface. The user interface according to the finger mode, if there are virtual objects provided before the finger mode, in response to the finger mode operated by a gesture input using fingers, may modify the properties of at least some of the virtual objects provided before entering the finger mode and display same in a specified area within the display area of the user interface.

According to an embodiment, when the finger mode is executed, the AR device 201 may receive a finger input through the user interface in the finger mode. The finger input is an input based on a user's finger gesture and may include, for example, an input function of switching to a screen in a direction corresponding to a finger gesture among the 360-degree screen according to 6Dof recognition or performing a specified function in response to a specified finger gesture.

If the received finger input is an input for selecting screen movement, the AR device 201 may move the area displayed by the user interface according thereto. For example, the finger input for selecting screen movement may include a finger gesture of indicating the left direction or right direction of the screen, a finger gesture of selecting one screen among a plurality of overlapping screens in various directions, or a finger gesture according to a sliding input in one lateral direction, for example, up, down, left, or right.

If the received finger input is an input for screen movement, the AR device 201 may display a screen in a direction corresponding to the finger input. For example, if the received finger input corresponds to a finger gesture indicating the left or right direction of the screen, the AR device 201 may move the screen in the corresponding direction and then display the screen. For example, if the received finger input is a finger gesture for selecting one screen among a plurality of overlapping screens of various sides, the AR device 201 may switch to a screen corresponding to the selected side and then display the screen. For example, if the AR device 201 receives a finger gesture according to a sliding input in one lateral direction, for example, up, down, left, or right, the AR device 201 may display a screen in a direction corresponding to the degree of sliding, among the 360-degree screens. For example, in the case of long sliding, the screen may be moved more. In addition, in the case of a sliding input, it is possible to switch the screen while continuously moving the screen in a direction of the sliding input and then display the same.

On the other hand, if the received finger input is not an input for selecting screen movement, the AR device 201 may perform a function corresponding to the finger input.

Figure 5:
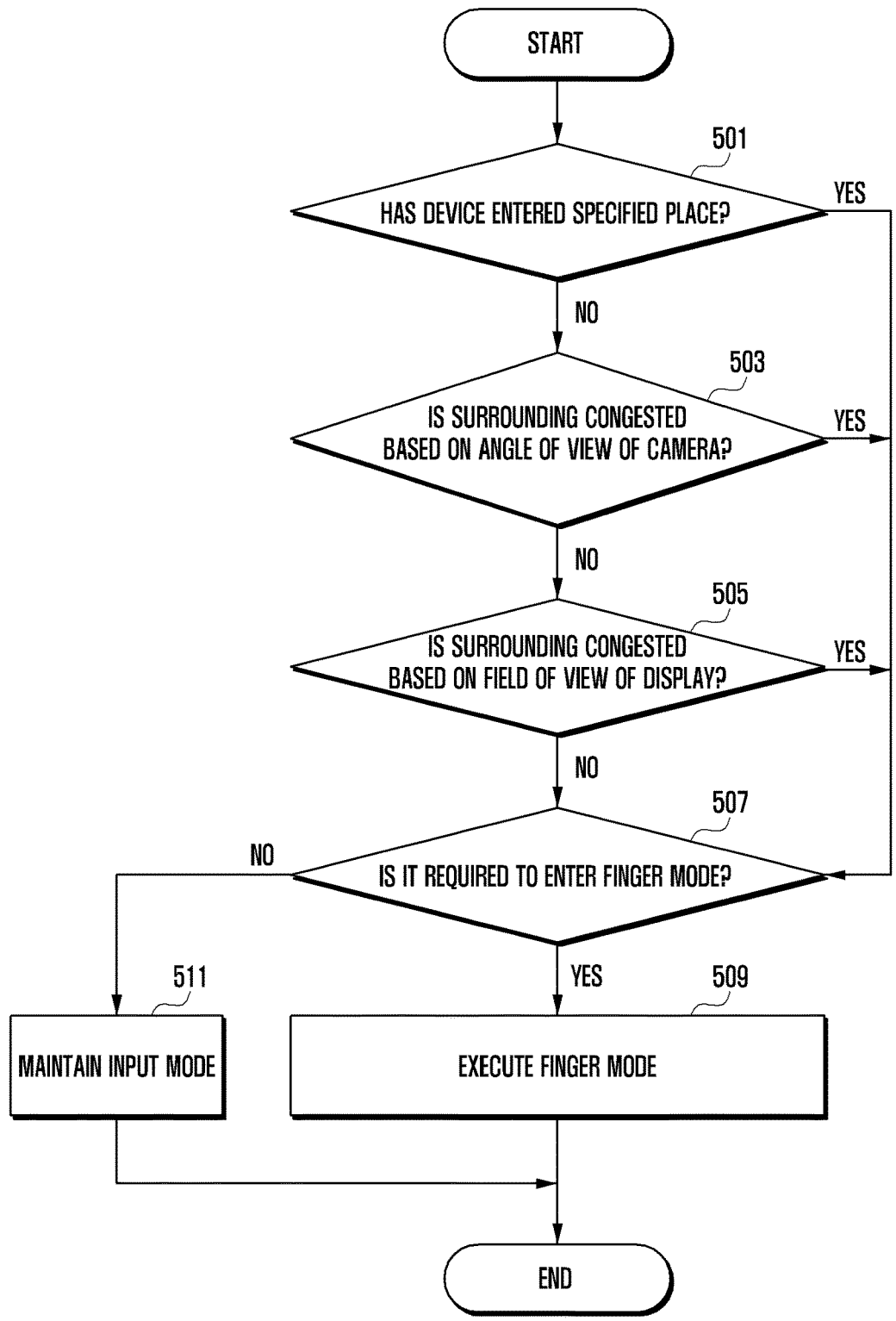
FIG. 5 is a flowchart illustrating an operation in which an AR device determines whether or not a situation requires entering a finger mode according to an embodiment of the disclosure.

FIG. 5 is a flowchart illustrating an operation in which an AR device determines whether or not the situation requires entering a finger mode according to an embodiment of the disclosure.

Figure 6:
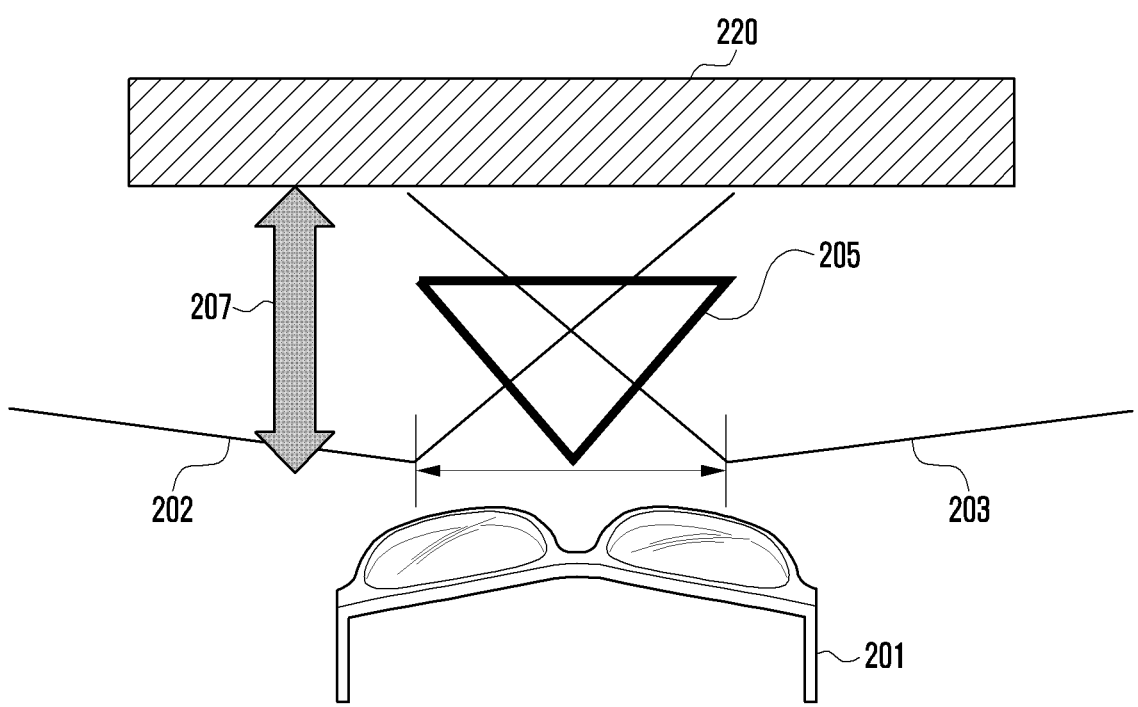
FIG. 6 is a diagram illustrating a situation in which an AR device enters a finger mode according to an embodiment of the disclosure.

FIG. 6 is a diagram illustrating the situation in which an AR device enters a finger mode according to an embodiment of the disclosure.

Referring to FIG. 5, an AR device (e.g., an AR device 201 in FIG. 3) may determine whether or not the situation is congested based on information of an image photographed by a camera (e.g., a camera 320 in FIG. 3). The AR device 201 may identify whether or not the user wishes to enter the finger mode depending on the congestion level and operate in the finger mode according to the user's selection. Among the operations described below, in the case of a high congestion level, in some cases, it may be modified to operate in the finger mode immediately while excluding a user selection operation. In addition, the user may select an operation in the finger mode from a menu of the AR device 201, regardless of the degree of congestion.

The AR device 201 may identify whether or not the device has entered a specified place in operation 501 and, if the device enters the specified place, proceed to operation 509 to determine whether or not to enter the finger mode.

The specified place is a place expected to be congested, for example, a public place, a place using a public AP, or a place expected to be congested, such as a public transportation vehicle or train, which may be specified in advance. However, in this case, since the place expected to be congested may not be crowded, the congestion level may be configured to be relatively low, and only if the user selects to enter the finger mode, entry into the finger mode may be allowed.

The AR device 201 may identify whether or not it is congested based on the angle of view of the camera (e.g., a HeT camera) in operation 503. For example, if there is a real object detected within a specified distance (e.g., 1.5 meters) in the angle of view of the camera, for example, the field of view, it may be identified as congested. If it is congested within a specified distance in the angle of view of the camera, the congestion level may be configured to be higher than that when entering a specified place.

The AR device 201 may identify whether or not it is congested based on the field of view (FoV) of the display in operation 505. For example, if there is a real object detected within a specified distance (e.g., 1.5 meters) in the field of view of the display, it may be identified as congested.

Referring to FIG. 6, an area 205 within a specified distance 207 (e.g., 1.5 meters) within 30 to 50 degrees, which is a field of view of the display, may be narrower than areas 202 and 203 within a specified distance of 1.5 meters in fields of view (FoV) of two cameras each having an angle of view of 100 degrees. Accordingly, the congestion level identified based on the field of view of the display may be configured to be higher than the congestion level identified based on the angle of view of the camera.

According to various embodiments, an operation of further identifying the degree of congestion within a shorter distance, based on the field of view of the display, may be further performed. For example, if there is a real object (e.g., first glass member 220) within the average human arm length (e.g., 0.8 meters) in the field of view of the display, it may be identified as congested, and in this case, the degree of congestion may be configured as the highest, compared to the previous operation.

According to various embodiments, if it is determined that there is a congested situation in operations 501 to 505, the AR device 201 may identify whether or not to switch the input mode of the AR device 201 to the finger mode in operation 507. For example, the AR device 201 may provide an image, text, and/or audio data to the user to identify whether or not to switch to the finger mode.

Three operations of operations 501 to 505 or four operations resulting from addition of identifying distances in the field of view of the display may be configured to increase as the inconvenience of performing a gesture in the real use environment increases, and in some cases, more operations may be added thereto. In addition, according to the configuration, if it is identified as congested in the operation (e.g., operation 505) in which the degree of congestion is configured to be higher among the operations 501 to 505 of identifying the degree of congestion, it may be implemented to notify the user of whether or not to switch to the finger mode and, if there is no user's selection for a specified time, immediately switch to the finger mode.

According to various embodiments, if it is determined to switch to the finger mode, the AR device 201 may execute the finger mode in operation 509. The AR device 201 may provide a user interface according to the finger mode as it switches to the finger mode. On the other hand, if switching to the finger mode is not needed, the AR device 201 may maintain the previous input mode (e.g., the both-handed mode) in operation 511.

Meanwhile, even if it is not a congested situation, the AR device 201 may enter or switch to the finger mode by, for example, the user selecting the finger mode through a configuration menu. For example, the finger mode may be selected according to the user's needs, such as if it is difficult for the user to perform a gesture input with both hands.

Figure 7:
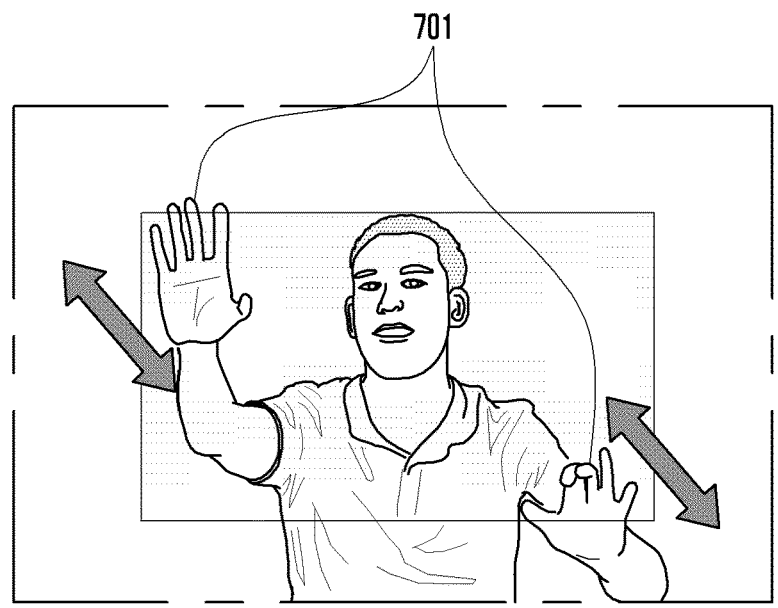
FIG. 7 is a diagram illustrating an example of an input operation in a finger mode of an AR device according to an embodiment of the disclosure.
Figure 7:
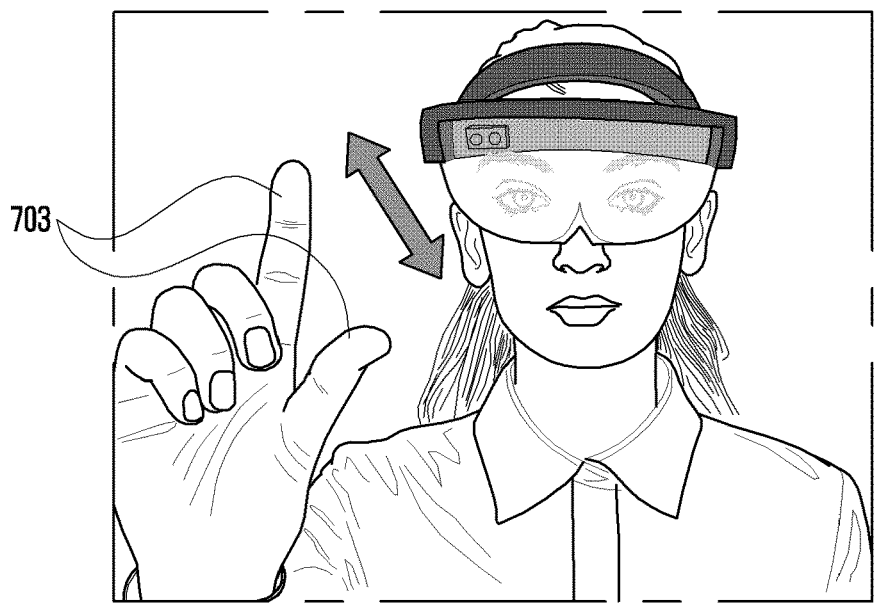

FIG. 7 is a diagram illustrating an example of an input operation in a finger mode of an AR device according to an embodiment of the disclosure.

Part (a) of FIG. 7 illustrates a general input operation in a both-handed mode, and, for example, a user may perform a gesture input of gathering or spreading both hands 701 as denoted by an arrow in order to perform a screen zoom-out or zoom-in function.

Part (b) of FIG. 7 illustrates an input operation in the finger mode, and, for example, the user may perform a finger input through a finger gesture of gathering or spreading, for example, two fingers 703 (e.g., thumb and index fingers) in order to perform a screen zoom-in or zoom-out function.

Figure 8:
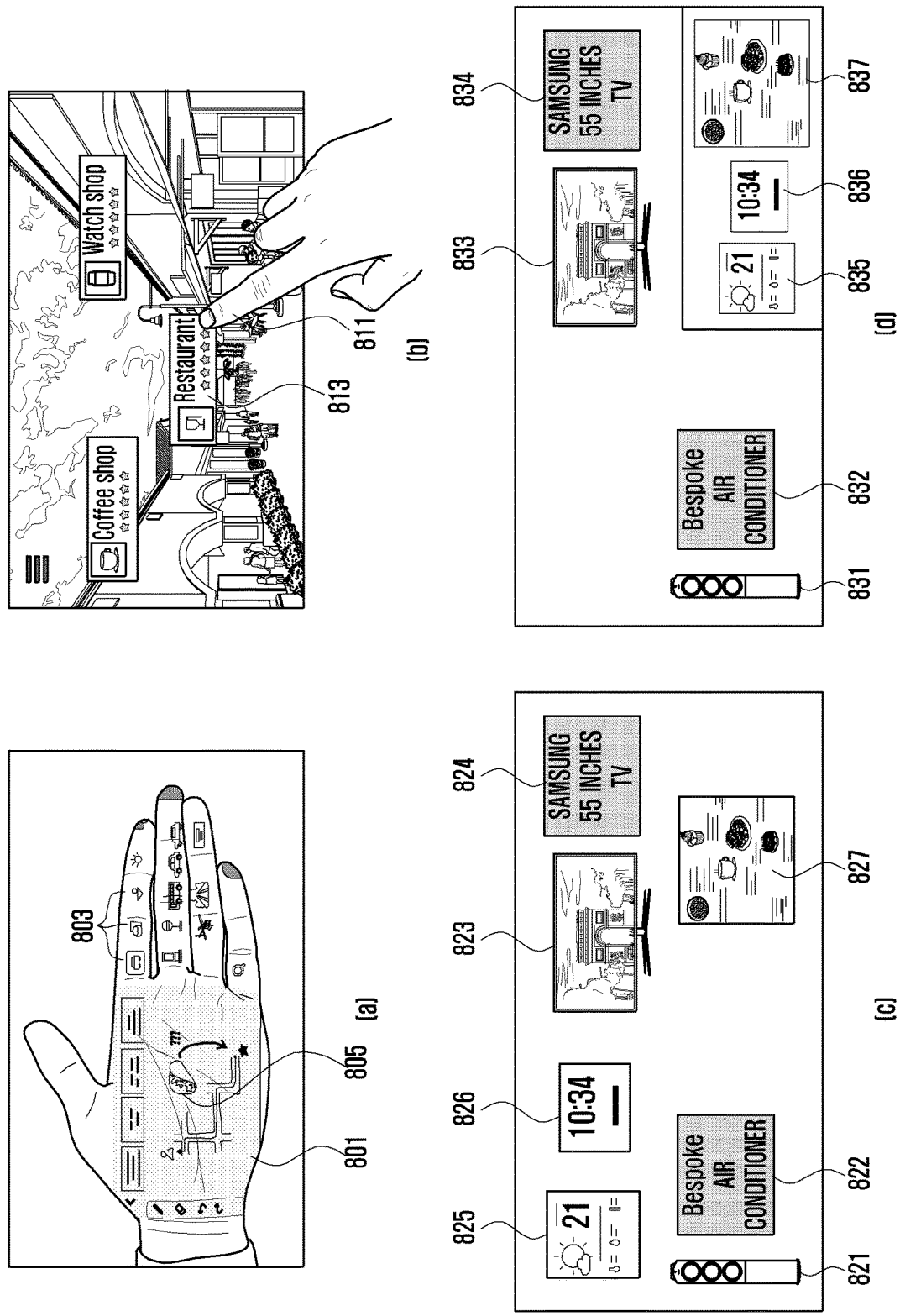
FIG. 8 is a diagram illustrating an example of a user interface in a finger mode of an AR device according to an embodiment of the disclosure.

FIG. 8 is a diagram illustrating an example of a user interface in a finger mode of an AR device (e.g., an AR device in FIG. 3) according to an embodiment of the disclosure.

Part (a) of FIG. 8 illustrates an example of displaying a user interface including a selectable menu icon 803 including a plurality of texts and images for finger mode input or a virtual object 805 within a specified area (e.g., the palm) 801. For example, the user may select the menu icon 803 or the virtual object 805 displayed on the user interface using a finger such that the AR device 201 performs a function corresponding to the selected menu or object. The specified area and the virtual object moving to the specified area may be configured, for example, based on the characteristics or direction of the user's gesture according to the user's intention, or may be configured by the user's selection. For example, if a user's finger gesture points to the upper left, virtual objects in the upper left may move to the specified area. The virtual objects moved to the specified area may be displayed in a reduced size depending on the size of the area.

Referring to part (b) of FIG. 8, the screen provided in the finger mode may include a user interface provided according to the finger mode. For example, the AR device 201 may display, on a screen, a virtual object 813 indicating a place and, if a finger input of touching the virtual object 813 using a finger 811 is performed, perform, in response thereto, a function indicated by the virtual object 813, for example, a function of providing information about the place (e.g., POI information), providing a reservation or order icon, or the like.

The AR device 201 may display the screen in part (b) of FIG. 8 inside a specific virtual object (e.g., a virtual object in the shape of a mobile phone) and display virtual objects 813 indicating places inside the mobile phone, thereby providing a user interface allowing finger input by manipulating the mobile phone using fingers.

Part (c) of FIG. 8 illustrates a user interface provided in a general input mode, and in the general input mode, real objects 821 and 823 (e.g., a display device and an air conditioner) may be displayed on the screen, and virtual objects 822 and 824 (e.g., POI information and information related to the real object) may be displayed therearound. In addition, virtual objects 825, 826, and 827 (e.g., weather information, time information, and food menu information) may be further displayed at the position that does not obstruct the display of the real objects 821 and 823 and the virtual objects 822 and 824 on the screen.

Part (d) of FIG. 8 illustrates a user interface provided according to a finger mode, and the display of the real objects 831 and 832 and the related virtual objects 832 and 834 displayed there around may be maintained on the screen. The virtual objects 835, 836, and 837 that are irrelevant to the real objects 821 and 823 or do not include position information may be moved to a specified area (e.g., a palm area or a lower right box area) on the screen and then displayed thereon. The specified area and the virtual object moving to the specified area may be configured, for example, based on the characteristic or direction of the user's gesture, or may be configured by the user's selection. The virtual objects moved to the specified area may be displayed in a reduced size depending on the size of the area.

Figure 9:
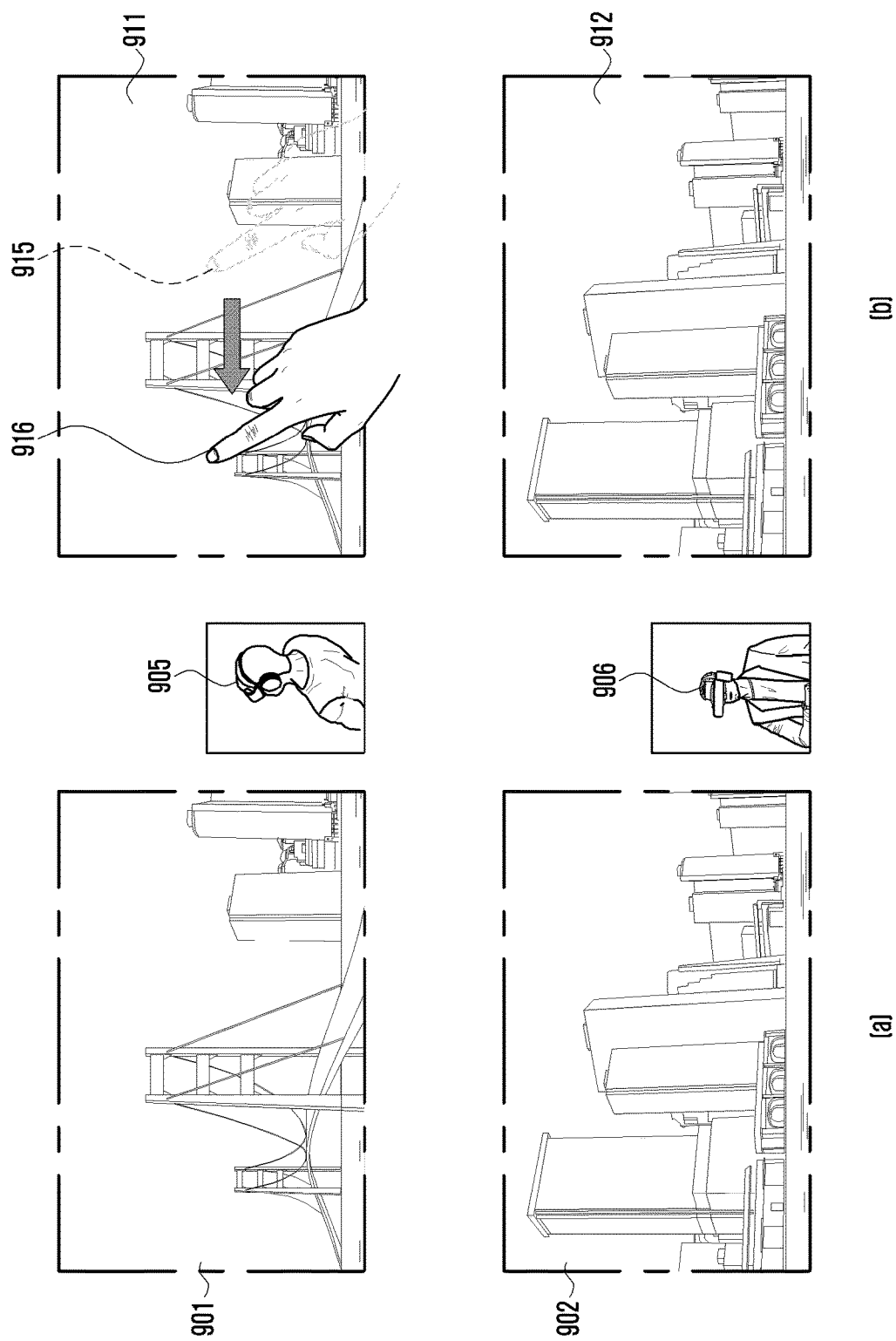
FIG. 9 is a diagram illustrating an example of an operation of providing a 360-degree screen in a finger mode of an AR device according to an embodiment of the disclosure.

FIG. 9 is a diagram illustrating an example of an operation of providing a 360-degree screen of an AR device (e.g., an AR device in FIG. 3) according to an embodiment of the disclosure.

Referring to part (a) of FIG. 9, the AR device 201 may obtain a 360-degree screen according to, for example, 6DoF recognition and, based on the field of view of a front camera (e.g., the gesture cameras 211-1 and 211-2 in FIG. 2A or FIG. 2B), provide a screen in front of the camera to the display in an input mode such as a general both-handed mode. Accordingly, if the user looks at the front (905), a front-facing screen 901 may be provided. A rear-facing screen 902 may be provided when the user turns his gaze toward the rear and directly gazes in the corresponding direction (906).

Referring to part (b) of FIG. 9, the AR device 201 may obtain a 360-degree screen according to, for example, 6DoF recognition and, based on the field of view of a front camera (e.g., the gesture cameras 211-1 and 211-2 in FIG. 2A or 2B), initially provide a screen 911 in front of the camera to the display. If the AR device 201 switches to the finger mode according to an increase in the congestion level when the surrounding environment is congested, it is possible to provide a screen in the direction corresponding to a finger input among the 360-degree screen in order to provide a screen in the direction that the user wishes to view by the finger input despite restriction of the user's motion. For example, the user may perform a finger gesture of sliding a finger in one lateral direction, for example, up, down, left, or right, and in response to such a finger input, the AR device 201 may provide a screen in the sliding direction. For example, if a finger input according to sliding a finger to the left is received, the AR device 201 may provide a screen in a direction corresponding to the degree of sliding to the left. In this case, the AR device 201 may operate such that the screen continuously moves in the sliding direction while the sliding remains from a starting point 915 to the left and such that a screen 912 in the direction corresponding to a point 916 at which the sliding is stopped is finally displayed.

Figure 10:
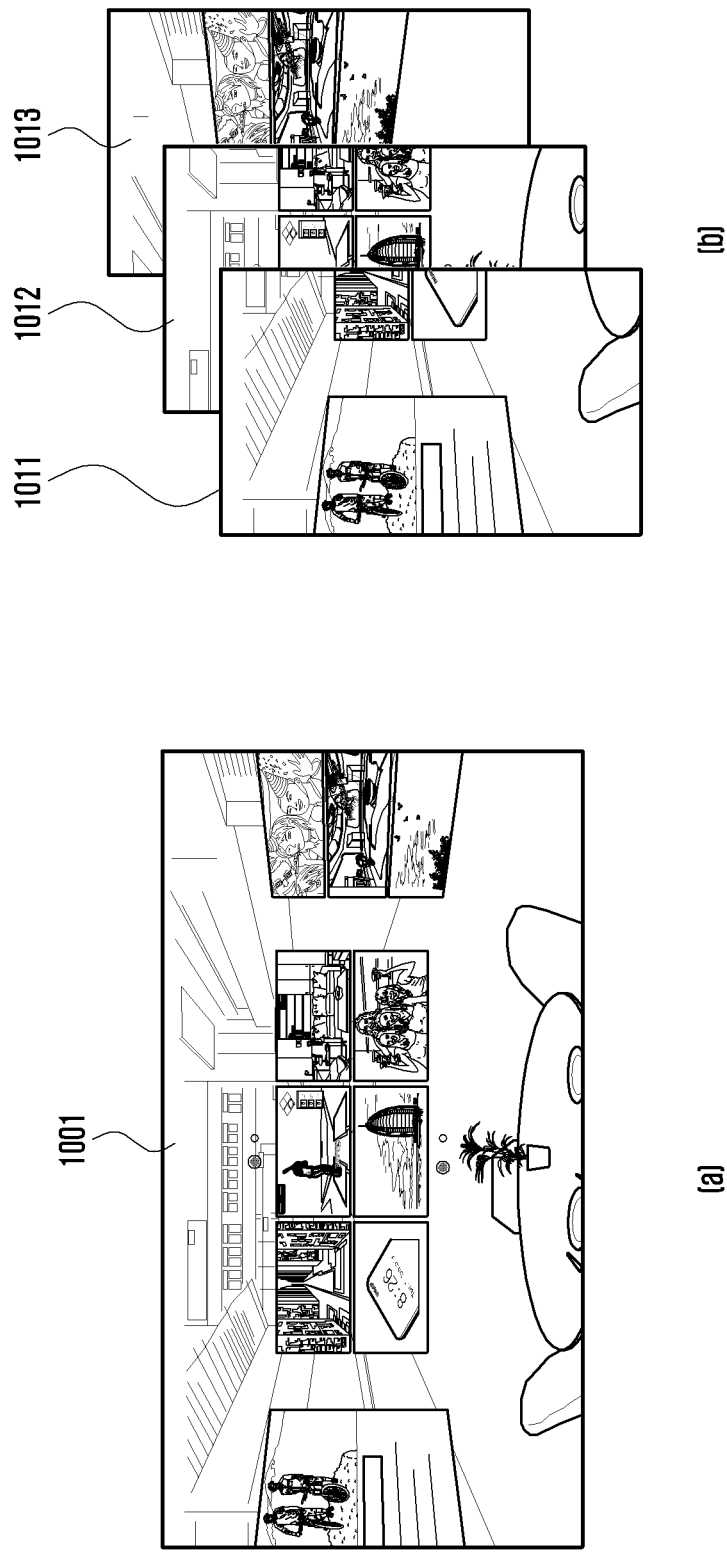
FIG. 10 is a diagram illustrating another example of an operation of providing a 360-degree screen in a finger mode of an AR device according to an embodiment of the disclosure.

FIG. 10 is a diagram illustrating another example of an operation of providing a 360-degree screen in a finger mode of an AR device (e.g., an AR device in FIG. 3) according to an embodiment of the disclosure.

Referring to part (a) of FIG. 10, the AR device 201 may obtain a 360-degree screen according to, for example, 6DoF recognition and, based on the field of view of a front camera (e.g., the gesture cameras 211-1 and 211-2 in FIG. 2A or FIG. 2B), provide a screen 1001 in front of the camera to the display in an input mode such as a general both-handed mode.

Referring to part (b) of FIG. 10 shows an example of a screen provided when the AR device 201 enters the finger mode. For example, the AR device 201 may obtain a 360-degree screen according to 6DoF recognition, and may divide the 360-degree screen into a plurality of screens 1011, 1012, and 1013 corresponding to various directions and display same in the finger mode. For example, the plurality of screens 1011, 1012, and 1013 respectively corresponding to various directions may be displayed on different layers, respectively, and the screens on the different layers may be displayed to at least partially overlap each other. For example, in response to a finger input for selecting any one of the plurality of displayed screens 1011, 1012, and 1013 with a finger, the AR device 201 may display a screen corresponding to the selected direction on the upper layer or in a full screen.

Figure 11:
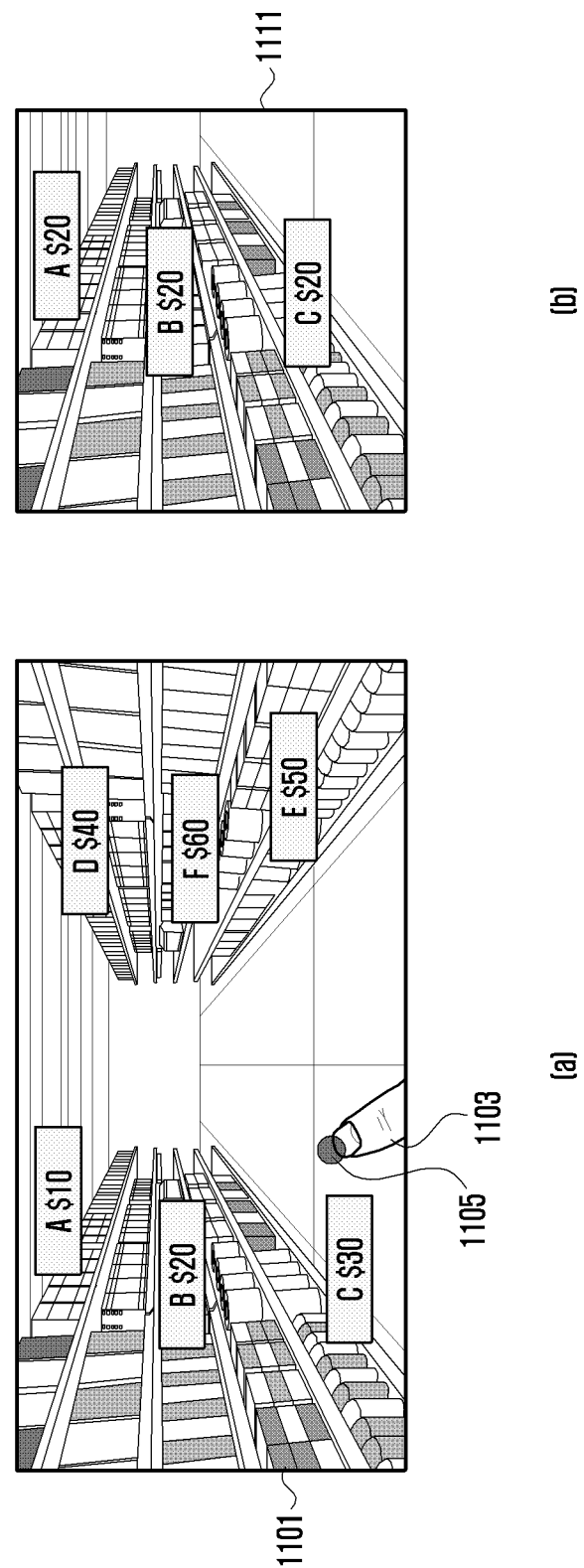
FIG. 11 is a diagram illustrating an example of an operation of providing a 360-degree screen in a finger mode of an AR device according to an embodiment of the disclosure.

FIG. 11 is a diagram illustrating an example of an operation of providing a 360-degree screen in a finger mode of an AR device (e.g., an AR device in FIG. 3) according to an embodiment of the disclosure.

Referring to part (a) of FIG. 11, the AR device 201 may obtain a 360-degree screen according to, for example, 6DoF recognition and, based on the field of view of a front camera (e.g., the gesture cameras 211-1 and 211-2 in FIG. 2A or FIG. 2B), provide a screen 1101 in front of the camera to the display in an input mode such as a general both-handed mode.

On the screen in part (a) of FIG. 11, the AR device 201 may perform a finger input through a gesture of pointing to, using a finger 1103, a point 1105 on the screen, which is not a selectable icon or an object on the screen 1101 displayed on the display, and holding the same for a specified time (e.g., 3 seconds) or longer.

Referring to part (b) of FIG. 11, the AR device 201 may display a partial screen or an enlarged screen 1111 in a selected direction in response to the finger input. For example, the AR device 201 may display a partial screen of the entire screen displayed on the display, which corresponds to the selected direction, as it is or to be enlarged.

Figure 12:
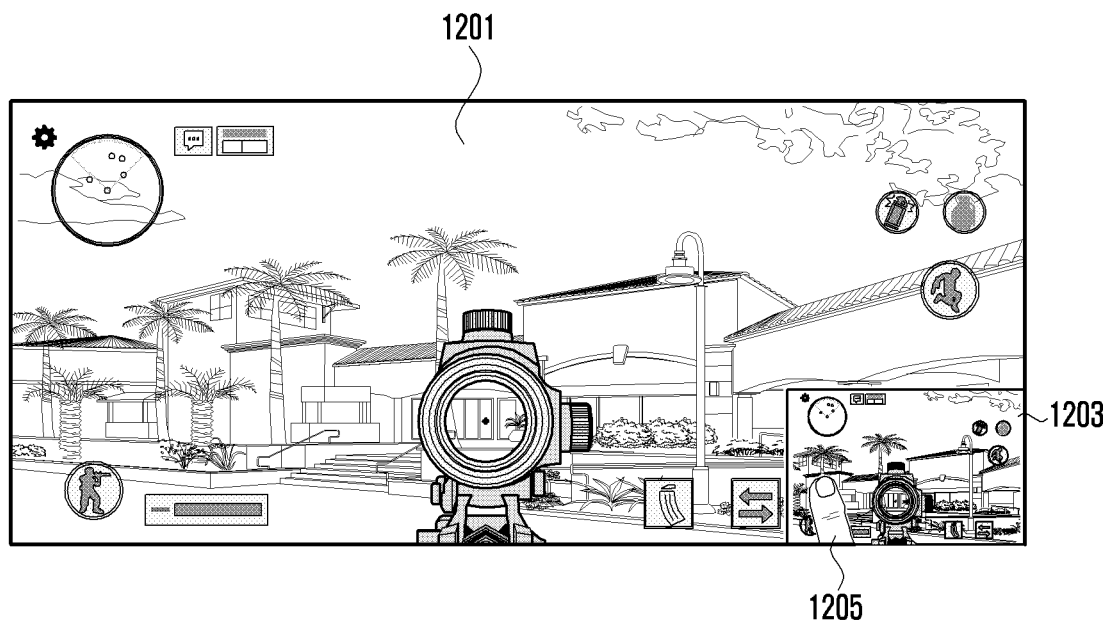
FIG. 12 is a diagram illustrating another example of an input operation in a finger mode of an AR device according to an embodiment of the disclosure.

FIG. 12 is a diagram illustrating another example of an input operation in a finger mode of an AR device (e.g., an AR device in FIG. 3) according to an embodiment of the disclosure.

Referring to FIG. 12, in order to easily select virtual objects of the entire display screen 1201 through finger input 1205, the AR device 201 may display virtual objects in a reduced size in the form of a mini-map on a specified area 1203 (e.g., a lower right box area). Accordingly, the user may perform input onto the entire screen using the mini-map of the specified area 1203, which makes it possible to easily perform input using a finger gesture in a congested situation where both hands or arms cannot freely move.

An electronic device (e.g., the AR device 201 in FIG. 2A, FIG. 2B, FIG. 2C, or FIG. 3) according to various embodiments may include at least one processor (e.g., the processor 340 in FIG. 3), at least one camera (e.g., the camera 320 in FIG. 3), and at least one display (e.g., the display module 350 in FIG. 3), wherein the processor may be configured to identify whether or not a situation requires entering a finger mode for an image including at least one or more objects received through the at least one camera, based on whether or not specified conditions are satisfied for the at least one or more objects, if the situation is identified to require entering the finger mode, execute a finger mode providing a user interface corresponding to the finger mode, and, if there are virtual objects provided before entering the finger mode, modify the properties of at least some of the virtual objects provided before entering the finger mode and display same in a specified area within a display area of the user interface corresponding to the finger mode.

According to various embodiments, an electronic device (e.g., the AR device 201 in FIG. 2A, FIG. 2B, FIG. 2C, or FIG. 3) may include at least one processor (e.g., the processor 340 in FIG. 3), at least one camera (e.g., the camera 320 in FIG. 3), and at least one display (e.g., the display module 350 in FIG. 3), wherein the processor may be configured to identify whether or not a situation requires entering a finger mode for an image including at least one or more objects received through the at least one camera, based on whether or not specified conditions are satisfied for the at least one or more objects, if the situation is identified to require entering the finger mode, execute a finger mode providing a user interface corresponding to the finger mode, and, if there are virtual objects provided before entering the finger mode, modify the properties of at least some of the virtual objects provided before entering the finger mode and display same in a specified area within a display area of the user interface corresponding to the finger mode.

According to various embodiments, the processor may be configured to identify distances to the at least one or more objects, based on the image received through the at least one camera, identify whether or not the distances are within a specified distance, and identify whether or not the situation requires entering the finger mode.

According to various embodiments, the processor may be configured to identify whether or not the at least one or more objects are within a specified distance, based on a portion of the image received through the at least one camera, which is displayed in a field of view of the display, thereby determining whether or not the situation requires entering the finger mode.

According to various embodiments, the processor may be configured to ask a user whether or not to enter the finger mode if the situation is identified to require entering the finger mode.

According to various embodiments, the processor may be configured to receive a finger input according to the execution of the finger mode and, if the finger input includes at least one of a finger sliding gesture or finger pointing to one direction on the user interface, move the display area provided by the user interface.

According to various embodiments, the processor may be configured to move the display area in a direction corresponding to the degree of sliding according to the finger sliding gesture or in a direction corresponding to the finger pointing according to the finger pointing.

According to various embodiments, the user interface corresponding to the finger mode may be configured to display a screen divided into a plurality of screens respectively corresponding to a plurality of directions as a plurality of layers in the order from an upper layer to a lower layer such that at least partial areas thereof overlap each other, and the processor may be configured to display, if an input for selecting any one of the plurality of divided screens is received, a screen selected from the plurality of divided screens as the upper layer.

According to various embodiments, the processor may be configured to perform, if a finger input for the at least some virtual objects, which are provided at a specified position by modifying the properties thereof, is received, a specified function on the virtual object in response to the finger input.

According to various embodiments, the specified conditions for the at least one or more objects may include at least one of conditions for the number, sizes, shapes, time, or positions of the at least one or more objects, which are identified through the camera.

According to various embodiments, at least some virtual objects among the at least one or more virtual objects displayed in the specified area may be configured to include at least one of a virtual object not including position information, a virtual object irrelevant to a real object, or a virtual object selected by a user.

According to various embodiments, a method of an electronic device (e.g., the AR device 201 in FIG. 2A, FIG. 2B, FIG. 2C, or FIG. 3) may include identifying whether or not a situation requires entering a finger mode for an image including at least one or more objects received through at least one camera (e.g., the camera 320 in FIG. 3), based on whether or not specified conditions are satisfied for the at least one or more objects, if the situation is identified to require entering the finger mode, executing a finger mode providing a user interface corresponding to the finger mode, and according to the execution of the finger mode, if there are virtual objects provided before entering the finger mode, modifying the properties of at least some of the virtual objects provided before entering the finger mode and displaying the same in a specified area within a display area of the user interface corresponding to the finger mode.

According to various embodiments, the identifying of the situation may include identifying distances to the at least one or more objects, based on the image received through the at least one camera, identifying whether or not the distances are within a specified distance, and identifying whether or not the situation requires entering the finger mode.

According to various embodiments, the identifying of the situation may include identifying whether or not the at least one or more objects are within a specified distance, based on a portion of the image received through the at least one camera, which is displayed in a field of view of the display, and determining whether or not the situation requires entering the finger mode.

According to various embodiments, the method may further include asking a user whether or not to enter the finger mode if the situation is identified to require entering the finger mode.

According to various embodiments, the method may further include receiving a finger input according to the execution of the finger mode and, if the finger input includes at least one of a finger sliding gesture or finger pointing to one direction on the user interface, moving the display area provided by the user interface.

According to various embodiments, the method may further include moving the display area in a direction corresponding to the degree of sliding according to the finger sliding gesture or in a direction corresponding to the finger pointing according to the finger pointing.

According to various embodiments, the user interface corresponding to the finger mode may be configured to display a screen divided into a plurality of screens respectively corresponding to a plurality of directions as a plurality of layers in the order from an upper layer to a lower layer such that at least partial areas thereof overlap each other, and if an input for selecting any one of the plurality of divided screens is received, a screen selected from the plurality of divided screens may be displayed as the upper layer.

According to various embodiments, the method may further include performing, if a finger input for the at least some virtual objects, which are provided at a specified position by modifying the properties thereof, is received, a specified function on the virtual object in response to the finger input.

According to various embodiments, the specified conditions for the at least one or more objects may include at least one of conditions for the number, sizes, shapes, time, or positions of the at least one or more objects, which are identified.

According to various embodiments, at least some virtual objects among the at least one or more virtual objects displayed in the specified area may include at least one of a virtual object not including position information, a virtual object irrelevant to a real object, or a virtual object selected by a user.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
at least one processor;
at least one camera; and
at least one display,
wherein the at least one processor is configured to:
identify whether or not a situation requires entering a finger mode for an image comprising at least one or more objects that is received through the at least one camera, based on whether or not specified conditions are satisfied for the at least one or more objects,
in case that the situation is identified that requires entering the finger mode, enter the finger mode and provide a user interface corresponding to the finger mode, and
in case that there are virtual objects provided before entering the finger mode, modify properties of at least some of the virtual objects provided before entering the finger mode and display the virtual objects provided before entering the finger mode in a specified area within a display area of the user interface corresponding to the finger mode.

2. The electronic device of claim 1, wherein the at least one processor is further configured to:
identify distances to the at least one or more objects, based on the image received through the at least one camera;
identify whether or not the distances are within a specified distance; and
identify whether or not the situation requires entering the finger mode.

3. The electronic device of claim 2, wherein the at least one processor is further configured to identify whether or not the at least one or more objects are within a specified distance, based on a portion of the image received through the at least one camera, which is in a field of view displayed in the display area, thereby determining whether or not the situation requires entering the finger mode.

4. The electronic device of claim 1, wherein the at least one processor is further configured to ask a user whether or not to enter the finger mode in case that the situation is identified to require entering the finger mode.

5. The electronic device of claim 1, wherein the at least one processor is further configured to:
receive a finger input according to the entering of the finger mode; and
in case that the finger input comprises at least one of a finger sliding gesture or finger pointing to one direction on the user interface, move the display area provided by the user interface.

6. The electronic device of claim 5, wherein the at least one processor is further configured to move the display area in a direction corresponding to a degree of sliding according to the finger sliding gesture or in a direction corresponding to the finger pointing according to the finger pointing.

7. The electronic device of claim 1,
wherein the user interface corresponding to the finger mode is further configured to display a screen divided into a plurality of screens respectively corresponding to a plurality of directions as a plurality of layers in order from an upper layer to a lower layer such that at least partial areas thereof overlap each other, and
wherein the at least one processor is configured to display, in case that an input for selecting any one of a plurality of divided screens is received, a screen selected from the plurality of divided screens as the upper layer.

8. The electronic device of claim 1, wherein the at least one processor is further configured to perform, in case that a finger input for the at least some of the virtual objects, which are provided at a specified position by modifying the properties thereof, is received, a specified function on a virtual object in response to the finger input.

9. The electronic device of claim 1, wherein the specified conditions for the at least one or more objects are configured to comprise at least one of conditions for a number, sizes, shapes, time, or positions of the at least one or more objects, which are identified through the at least one camera.

10. The electronic device of claim 1, wherein at least two or more of the virtual objects among the at least some of the virtual objects displayed in the specified area are configured to comprise at least one of a virtual object not comprising position information, a virtual object irrelevant to a real object, or a virtual object selected by a user.

11. A method performed by an electronic device, the method comprising:
identifying whether or not a situation requires entering a finger mode for an image comprising at least one or more objects that is received through at least one camera, based on whether or not specified conditions are satisfied for the at least one or more objects;
in case that the situation is identified that requires entering the finger mode, entering the finger mode and providing a user interface corresponding to the finger mode; and
according to the entering of the finger mode, in case that there are virtual objects provided before entering the finger mode, modifying properties of at least some of the virtual objects provided before entering the finger mode and displaying the virtual objects provided before entering the finger mode in a specified area within a display area of the user interface corresponding to the finger mode.

12. The method of claim 11, wherein the identifying of the situation comprises:
identifying distances to the at least one or more objects, based on the image received through the at least one camera;
identifying whether or not the distances are within a specified distance; and
identifying whether or not the situation requires entering the finger mode.

13. The method of claim 12, wherein the identifying of the situation comprises:
identifying whether or not the at least one or more objects are within a specified distance, based on a portion of the image received through the at least one camera, which is in a field of view displayed in the display area; and
determining whether or not the situation requires entering the finger mode.

14. The method of claim 11, further comprising:
asking a user whether or not to enter the finger mode in case that the situation is identified to require entering the finger mode.

15. The method of claim 11, further comprising:
receiving a finger input according to the entering of the finger mode; and
in case that the finger input comprises at least one of a finger sliding gesture or finger pointing to one direction on the user interface, moving the display area provided by the user interface.

16. The method of claim 15, further comprising:
moving the display area in a direction corresponding to a degree of sliding according to the finger sliding gesture or in a direction corresponding to the finger pointing according to the finger pointing.

17. The method of claim 11,
wherein the user interface corresponding to the finger mode is configured to display a screen divided into a plurality of screens respectively corresponding to a plurality of directions as a plurality of layers in order from an upper layer to a lower layer such that at least partial areas thereof overlap each other, and wherein the method further comprises, in case that an input for selecting any one of a plurality of divided screens is received, displaying a screen selected from the plurality of divided screens as the upper layer.

18. The method of claim 11, further comprising:
performing, in case that a finger input for the at least some of the virtual objects, which are provided at a specified position by modifying the properties thereof, is received, a specified function on a virtual object in response to the finger input.

19. The method of claim 11, wherein the specified conditions for the at least one or more objects are configured to comprise at least one of conditions for a number, sizes, shapes, time, or positions of the at least one or more objects, which are identified.

20. The method of claim 19, wherein at least some virtual objects among the at least some virtual objects displayed in the specified area are configured to comprise at least one of a virtual object not comprising position information, a virtual object irrelevant to a real object, or a virtual object selected by a user.

\* \* \* \* \*